US011244077B2

(12) United States Patent
Bandi et al.

(10) Patent No.: US 11,244,077 B2
(45) Date of Patent: Feb. 8, 2022

(54) SECURING DATA INTEGRITY FOR AN APPLICATION (71) Applicant: Fortanix, Inc., Mountain View, CA (US)

(72) Inventors: Nehal Bandi, San Jose, CA (US); Andrew Leiserson, San Francisco, CA (US)

(73) Assignee: Fortanix, Inc., Mountain View, CA (US)

( * ) Notice: Subject to any disclaimer, the term of this patent is extended or adjusted under 35 U.S.C. 154(b) by 172 days.

(21) Appl. No.: 16/779,331

(22) Filed: Jan. 31, 2020

(65) Prior Publication Data

US 2021/0240857 A1 Aug. 5, 2021

(51) Int. Cl.
G06F 21/64 (2013.01)
H04L 9/32 (2006.01)
H04L 9/06 (2006.01)

(52) U.S. Cl.
CPC ............ G06F 21/64 (2013.01); H04L 9/3236 (2013.01); *G06F 2221/2149* (2013.01)

(58) Field of Classification Search
CPC ............ G06F 21/64; G06F 2221/2149; H04L 9/3236; H04L 9/0643; H04L 9/3247
See application file for complete search history.

(56) References Cited

U.S. PATENT DOCUMENTS

| | | | | |
|---|---|---|---|---|
| 8,489,868 B2* | 7/2013 | Yach | ...................... | H04L 63/123 713/1 |
| 9,577,829 B1* | 2/2017 | Roth | ...................... | H04L 9/3236 |
| 10,142,109 B2* | 11/2018 | Edwards | ................ | H04L 9/3242 |
| 10,339,299 B1* | 7/2019 | Magnuson | ............ | H04L 9/3239 |
| 10,607,024 B2* | 3/2020 | Peterson | ................. | H04L 9/088 |
| 10,719,373 B1* | 7/2020 | Koponen | .............. | H04L 9/0891 |
| 10,762,197 B1* | 9/2020 | Yu | .......................... | H04L 9/3247 |
| 2006/0126468 A1* | 6/2006 | McGovern | .............. | G06F 21/64 369/53.1 |
| 2009/0165148 A1* | 6/2009 | Frey | ..................... | G06F 21/6281 726/30 |
| 2009/0172814 A1* | 7/2009 | Khosravi | ................. | G06F 21/51 726/23 |
| 2010/0262841 A1* | 10/2010 | Ekberg | ..................... | G06F 21/57 713/193 |
| 2014/0298420 A1* | 10/2014 | Barton | .................... | H04L 63/10 726/4 |
| 2018/0241572 A1* | 8/2018 | Miele | ..................... | H04L 9/0643 |
| 2018/0254906 A1* | 9/2018 | Tofts | ....................... | G06F 21/51 |
| 2019/0058696 A1* | 2/2019 | Bowman | ............... | H04L 9/3236 |
| 2019/0243963 A1* | 8/2019 | Soriente | ................ | H04L 9/0844 |
| 2020/0356679 A1* | 11/2020 | Cooke | ................. | H04L 67/1097 |

* cited by examiner

*Primary Examiner* — Darren B Schwartz (74) *Attorney, Agent, or Firm* — Lowenstein Sandler LLP (57) ABSTRACT A request to provide an application at a secure enclave of a server may be received. A hash value of the application may be generated. Application data that is to be used with the application at the secure enclave of the server may be identified. Another hash value of the application data that is to be used with the application at the secure enclave of the server may be generated. The hash value of the application and the other hash value of the application data may be signed where the signed hash value and other hash are being used to execute the application with the application data at the secure enclave of the server.

17 Claims, 6 Drawing Sheets

SECURING DATA INTEGRITY FOR AN APPLICATION

TECHNICAL FIELD

Aspects of the present disclosure relate generally to security, and more specifically, relate to securing data integrity for an application.

BACKGROUND

An application may operate or utilize data. For example, the application may access or read data from a file system when the application is executing. The application may be executed in a data center. The data center may verify the application before executing the application. For example, a hash value of the application may be generated and may be compared with a known hash value of a verified application. If the hash values match, then the data center may proceed to execute the application.

BRIEF DESCRIPTION OF THE DRAWINGS

The present disclosure will be understood more fully from the detailed description given below and from the accompanying drawings of various implementations of the disclosure.

DETAILED DESCRIPTION

Aspects of the present disclosure relate to securing data integrity for an application. A data center may correspond to a group of servers that are used to execute applications that operate with application data. An example of application data includes, but is not limited to, a file, file system, container settings, or any other information or data that is used to execute an application. A server of the data center may execute the application within a secure enclave. Another server of the data center may prepare the application to be executed within a secure enclave. In general, a secure enclave may refer to a protected address space of a memory that is provided by a processor of the server. For example, a server of the data center may receive the application prepared to be executed in a secure enclave provided by the processor and execute the application within the secure enclave provided by the processor. The secure enclave may further store application data that is accessed by the application within the secure enclave.

When a client device of the application requests that the application be executed at the secure enclave of a server of the data center, the application may be verified before being executed. For example, when the application (e.g., software code of the application) was first provided to the data center, a server that prepares the application to be executed within a secure enclave (this server may be different from the server that executes the application) may generate a hash value (or checksum value or any other such value) of the software code of the application to be used as a reference for verification of the application before the application is executed within a secure enclave. As another example, the reference hash value of the application may be provided to the data center. Subsequently, when a client device requests that the application be executed at the data center, a server to execute the application may generate a hash value of the requested application and compare the generated hash value of the application with the reference hash value for the application. If the two hash values match, then the requested application is the same as the prior application received at the server. Accordingly, after the verification of the application, the server may execute the application in the secure enclave. Otherwise, if the two hash values do not match, then the requested application is not verified and the server may not execute the application. However, while the application itself may be verified, the application data that the application accesses while executing is not verified. Thus, the security of the application may be compromised if the application data is changed as the application may operate or execute upon unverified or compromised application data that may change the operation or behavior of the application.

Aspects of the present disclosure address the above and other deficiencies by securing the integrity of the application data. For example, when an application (e.g., software code of the application) is provided to be verified for execution in a secure enclave of a server, the application data that is to be used by the application may also be verified. As an example, the application data may be a file system that is read by the application during execution. A hash value (or other such value) of the file system may be generated when the application is verified. Thus, the application data is also verified when the application is verified.

In some embodiments, when a client device of the application provides the application (e.g., software code of the application) to the data center, the client device may also specify a portion of the application data that is to be protected or verified. For example, if the application data is a file system, then the client device may specify a particular file or a directory of the file system that is to be protected. The hash value of the protected portion of the application data may then be generated, as a part of preparing the application to be executed in a secure enclave. For example, to prepare the application be executed in a secure enclave, a server (which may or may not be the same as a server executing the application) of the data center may convert the software code of the application to a disk image file (e.g., an appimage file). The server may generate a hash value of the application data and include the hash value of the application data as a part of the converted application. Then, the server may generate a final hash value of the software code or contents of the application and the hash value of the application data. In response, the server may sign the final hash value using a cryptographic key. Accordingly, the signature includes the reference hash value of the application and the reference hash value of the application data.

Subsequently, when the application is executed at the data center and attempts to access the application data, another hash value is generated for the portion of the accessed application data and compared with the reference hash value of the protected portion of the application data from the signature. If the two hash values of the application data match, then the portion of the underlying accessed application data is secure and the application may be allowed to execute with the application data. Otherwise if the hash values do not match, then the application may not be allowed to execute.

Advantages of the present disclosure include, but are not limited to, improved security for an application. For example, since the application data used by the application may impact the performance or configuration of the application, the protection of the underlying application data may further enhance security for the application. As a result, the execution of applications at secure enclaves of servers within a data center may be more secure.

Figure 1:
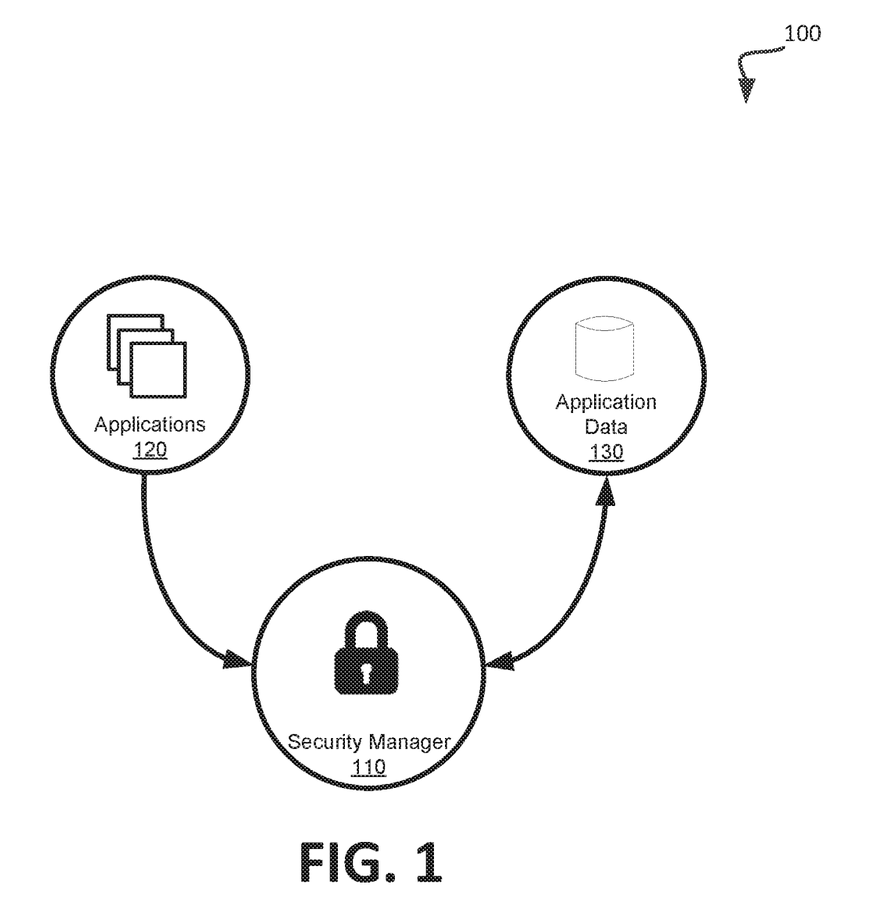
FIG. 1 illustrates an environment to provide secure data integrity for an application in accordance with some embodiments.

FIG. 1 illustrates an environment 100 to provide secure data integrity for an application in accordance with some embodiments. In general, the environment 100 may include a security manager 110, one or more applications 120, and application data 130.

As shown in FIG. 1, a server may provide a security manager 110 that is used to manage applications 120 and application data 130. For example, the security manager 110 may manage applications 120 and application data 130 at other servers in a data center. In some embodiments, the security manager 110 may correspond to a secure enclave as further described with respect to FIG. 5. In some embodiments, the security manager 110 may determine whether or not to execute an application 120 with application data 130 at a server of the data center.

In operation, a client device may provide an application 120 (e.g., software code of the application 120) to the data center. The application 120 may be an application that has not been previously provided or executed at a secure enclave of a server of the data center. In some embodiments, the application 120 may be converted to be executed within a secure enclave. For example, a wrapper may be used for the application 120 to interact with a secure enclave. Moreover, the software code of the application 120 may be converted to a disk image format.

When a client device provides the application 120 (e.g., software code of the application 120) to the data center to be executed within a secure enclave, the client device may further specify application data 130 that is to be used by the application 120. The application data 130 can be, but is not limited to, a file system that is used by the application 120, configuration settings for the application 120 (e.g., settings for a container of the application 120), network configuration settings such as an Internet Protocol (IP) address used by the application 120, policies used to manage the application 120, or any other data or information that is used to execute the application is accessed or operated upon by the application. The client device may specify that all of the application data 130 is to be protected or that a portion (e.g., a proper subset) of the application data 130 is to be protected when being accessed by the application 120 as described in further detail below. In some embodiments, the security manager 110 may generate a hash value of the indicated portion of the application data 130. Such a hash value of the application data 130 may later be used as a reference hash value in verifying the application data 130 before allowing the application data 130 to be accessed by the application 120. Moreover, the security manager 110 can store the reference hash value of the application data 130 with the application 120. In one implementation, the security manager 110 can include the reference hash value of the application data 130 as a part of the application 120 that is converted to be executed in a secure enclave. In some other embodiments, another processing logic or processing device at the data center may generate the reference hash value of the application data 130.

In some embodiments, the conversion of the application 120 may include a signing of the application 120. The signing the application may correspond to generating a reference hash value (or checksum or any other value) of the contents or software code of the application 120 based on a cryptographic key. The application data 130 may also be signed by the cryptographic key that is used to sign the application 120. For example, a hash value or a data structure that includes the hash value of the application data 130 (or a portion that is to be protected) may be signed by the same cryptographic key that was used to sign the application 120. In such a case, the reference hash value of the application 120 and the reference hash value of the application data 130 can be determined from the signature. Subsequently, when a client device seeks to execute the application 120 at the data center, a hash value of the requested application 120 may be generated and compared with the reference hash value of the application 120 that was previously generated when the application 120 was converted to be provided at a secure enclave (the reference hash value of the application 120 included in the signature associated with the application). If the two hash values match, then the application 120 may be allowed to execute at the data center. Furthermore, a hash value of the application data 130 to be accessed by the application 120 during the execution may be compared with the reference hash value of the application data that was generated as a part of the application 120 conversion process (the reference hash value of the application data 130 included in the signature associated with the application). If the two hash values of the application data 130 match, then the application 120 may be allowed to execute at the data center and may be allowed to access and read the application data 130. Otherwise, the application 120 may not be allowed to access and read the application data 130. In some embodiments, the verification of the hash values may be performed each time that the application 120 accesses the application data 130 during an execution in a secure enclave.

Figure 2:
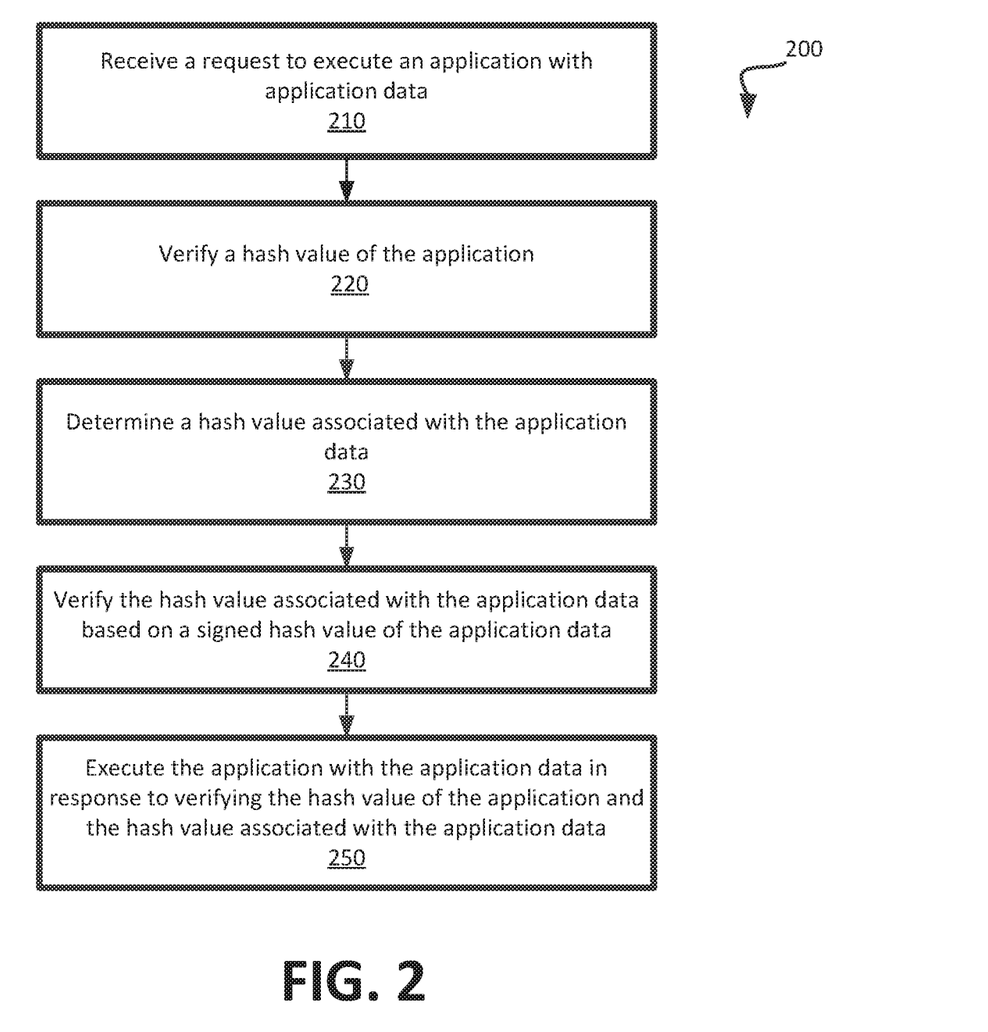
FIG. 2 is a flow diagram of an example method to execute an application with application data in accordance with some embodiments of the present disclosure.

FIG. 2 is a flow diagram of an example method 200 to execute an application with application data in accordance with some embodiments of the present disclosure. In general, the method 200 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the security manager 110 of FIG. 1.

For simplicity of explanation, the methods of the present disclosure are depicted and described as a series of acts. However, acts in accordance with the present disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 2, the method 200 may begin with processing logic receiving a request to execute an application with application data (operation 210). For example, a client device may provide a request for the application to execute within a secure enclave of a server of a data center with the application data. The application may access or read the application data when the application is executed within the secure enclave. At operation 220, the processing logic may verify a hash value of the application. For example, a server may receive the request to execute a particular application. The hash value (or a checksum value or other such value) of the particular application may be generated and compared to a prior known hash value of the application when the application was prepared to be executed within a secure enclave.

For example, the same processing logic of FIG. 2 or a different processing logic may receive a request to provide an application at a secure enclave of a server at the data center. In response to receiving the request, the processing logic may generate a hash value of the application. In some embodiments, the request may also specify application data (or a portion of the application data) that is to be accessed by the application and that is to be protected. Accordingly, the processing logic may identify an application data that is to be used with the application at the secure enclave of the server. The processing logic may generate a hash value of the application data that is to be used with the application at the secure enclave of the server. The processing logic can sign the hash value of the application and the hash value of the application data (that are to be used as reference hash values). The signed hash value of the application and the signed hash value of the application data will be used to execute the application with the application data at the secure enclave of the server. As such, a data structure may be signed and may include the reference hash value for the application and the reference hash value of the application data.

Back to operation 220, the signature may be verified (e.g., by the internal cryptographic key of the processor or any other cryptographic key that was used to sign). In response to verifying the signature, a hash value of the software code of the requested particular application may be generated and compared with the reference hash value of the application that was included in the data structure. If the two hash values match, then the application may be considered a verified application that may be allowed to execute at the secure enclave of the server. Otherwise, the application may not be allowed to execute at the server enclave of the server.

At operation 230, a hash value associated with the application data may be determined. In one implementation, a hash value (or checksum value or other such value) of the particular application data may be generated. For example, the hash value of the contents of the application data may be generated. In some embodiments, a hash value of a portion of the application data may be generated as further described below.

At operation 240, the processing logic may verify the hash value associated with the application data based on a signed hash value of the application data. For example, a data structure may be signed by the same cryptographic key that signed the data structure that included the reference hash value for the application. The other data structure may include a reference hash value for the application data that is generated from the contents of the application data.

Figure 3A:
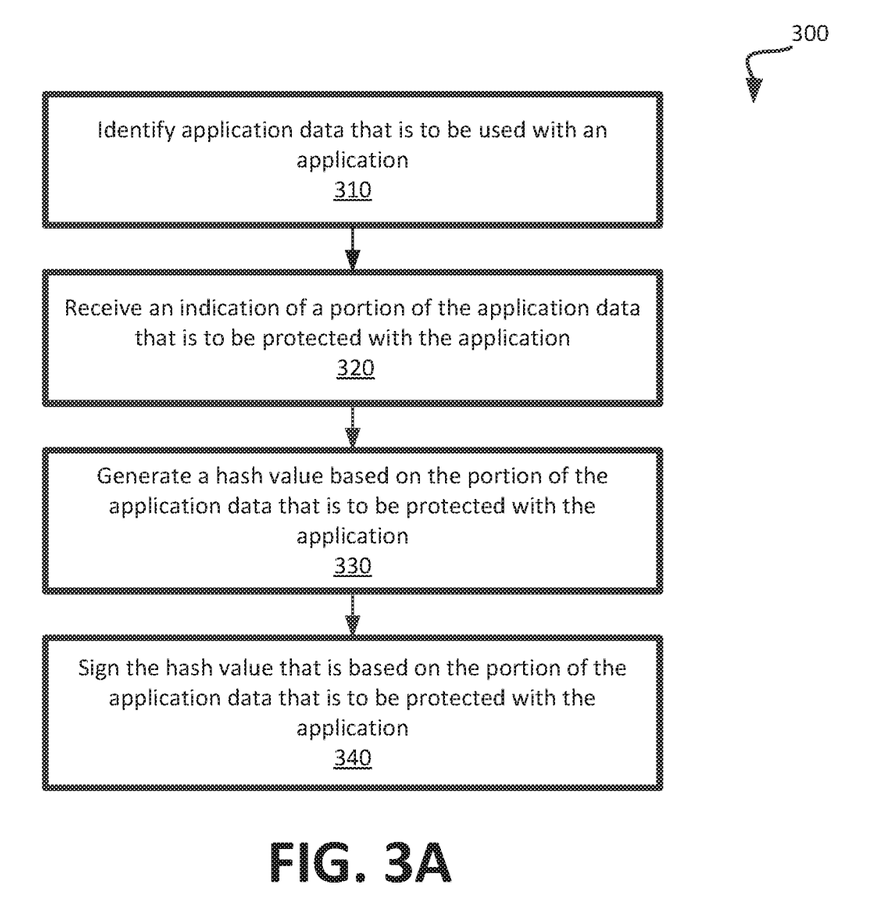
FIG. 3A is a flow diagram of an example method to sign a hash value associated with application data in accordance with some embodiments of the present disclosure.
Figure 3B:
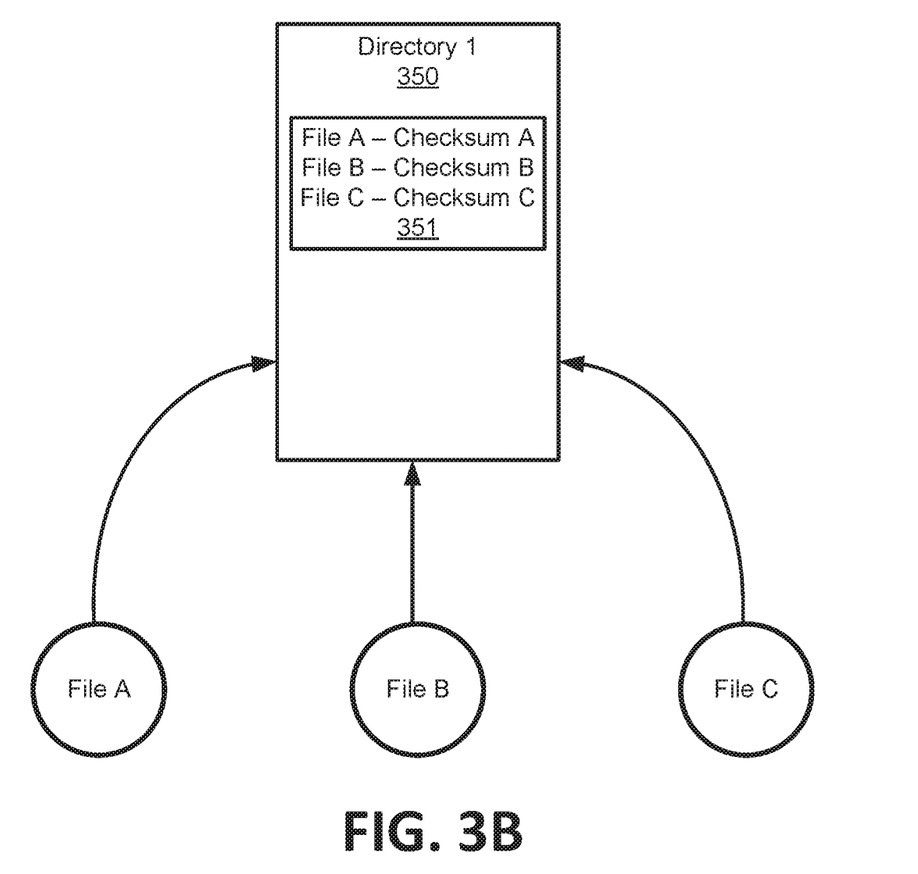
FIG. 3B illustrates the generating of a hash value associated with application data in accordance with some embodiments of the present disclosure.

Further details with respect to generating the hash value of the application data are described in conjunction with FIGS. 3A and 3B. The particular application may be associated with a signature and a hash value (or a checksum value or other such value that is generated from the software code of the particular application). The generated hash value of the application data may be compared with the reference hash value of the application data from the signature. If the hash values match, then the application data to be provided with the application may be considered to be verified. Otherwise, if the hash values do not match, then the application data that is to be provided with the application may not be considered to be verified.

At operation 250, the processing logic may execute the application with the application data in response to verifying the hash value of the application and the hash value associated with the application data. For example, the application may be allowed to execute at the secure enclave of the server and may be allowed to access the application data. Otherwise, if one or both of the hash value of the application or the hash value associated with the application data is not verified, then the application may not be executed at the secure enclave of the server.

In some embodiments, the verification of the hash value of the application may be performed when the application is first requested to be executed at the secure enclave of the server. The verification of the hash value associated with the application data may be performed each time that the application accesses the application data. For example, each time that the application reads information or data from the application data, the verification of the hash value associated with the application data may be performed.

In some embodiments, the application may be allowed to execute if the application is verified but the application data is not verified when accessed by the application. For example, certain functionality of the application (e.g., certain operations, access to computing resources or other data, etc.) may be disabled if the application data is not verified while the functionality of the application may not be disabled if the application data is verified. In the same or alternative embodiments, a warning message may be generated for an administrator of the data center when the application data is not verified. The warning message may identify, but is not limited to, the application, the application data, a user who has requested the execution of the application, the secure enclave and server that was to execute the application, and a time when the application was requested to be executed.

FIG. 3A is a flow diagram of an example method 300 to sign a hash value associated with application data in accordance with some embodiments of the present disclosure. In general, the method 300 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the security manager 110 of FIG. 1.

As shown in FIG. 3A, at operation 310, the processing logic may identify application data that is to be used with an application. For example, a user may provide an application that is to be executed at a data center and may further provide or specify a file system, configuration data for the application or a container for the application, etc. At operation 320, the processing logic may receive an indication of a portion of the application data that is to be protected with the application. For example, the user may indicate that all of the application data is to be protected or a portion (e.g., a proper subset) of the application data is to be protected when executing the application. Thus, when a portion of the application data is to be protected, a first portion of the application data may be protected while a second portion of the application data is not protected. At operation 330, the processing logic may generate a hash value based on the portion of the application data that is to be protected with the application. For example, a hash value may be generated based on the contents of the portion of the application data that is to be protected. In some embodiments, the content may correspond to metadata of the portion of the application data where the metadata identifies information of files and/or directories as previously described. Thus, the hash value may be generated based on the contents of the portion of the application data that is to be protected while the other portions of the application data that are not protected are not used to generate the hash value. Further details with respect to generating the hash value are described in conjunction with FIG. 3B.

At operation 340, the processing logic may sign the hash value that is based on the portion of the application data that is to be protected with the application. For example, a data structure (e.g., a certificate or other such data) may include the hash value of the portion of the application data. The data structure may be signed by a cryptographic key as previously described. In some embodiments, the data structure may further identify the application that is to be used with the protected portion of the application data.

FIG. 3B illustrates the generating of a hash value associated with application data in accordance with some embodiments of the present disclosure. In general, the hash value may be generated by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the hash value may be generated by the security manager 110 of FIG. 1.

As shown in FIG. 3B, application data may be, but is not limited to, a file system. For example, the file system may include a directory 350 with multiple files A, B, and C. A hash value or checksum value for a file may be based on the contents of the file. For example, if the portion of the file system that is to be protected is a configuration file that provides settings for the application or a container of the application, then the file is protected by generating the hash value or checksum value of the content that corresponds to the settings for the application in the file. If the portion of the file system that is to be protected is the directory 350, then the directory and the underlying files and other underlying sub-directories may be protected by generating a hash value or checksum value for the protected directory 350. In some embodiments, the hash value or checksum value for a directory is generated based on metadata of the directory. The metadata may identify each file that is under the directory and the checksum or hash values of the content of each of the files. In some embodiments, each file may include metadata that identifies the owner or creator of the file, a time when the file was created, a size of the file, a last time that the file was modified, or any other information of the file. The hash value or checksum of the directory may then be based on the metadata of the directory and/or files. For example, the hash value or the checksum of the directory 450 may be generated based on the contents of the metadata 351. Thus, the hash value or checksum of a directory may be based on a combination of the file names of underlying files (and/or names of underlying directories) and the hash values or checksum values of the underlying files.

In some embodiments, different files may be protected with the application. For example, a user may specify that File A and File C are to be protected but File B is not to be protected. Thus, a hash value or checksum value may be generated for each of File A and File C or a combined hash value or checksum value may be generated for both of the Files A and C. In the same or alternative embodiments, a particular directory and a file that is not organized under the particular directory may be protected. In such a case, a hash value or checksum value may be generated for the particular directory while another hash value or checksum value may be generated for the file as previously described. In some embodiments, a combined hash value or checksum value may be generated based on the hash values or checksum values for the particular directory and the file.

Figure 4:
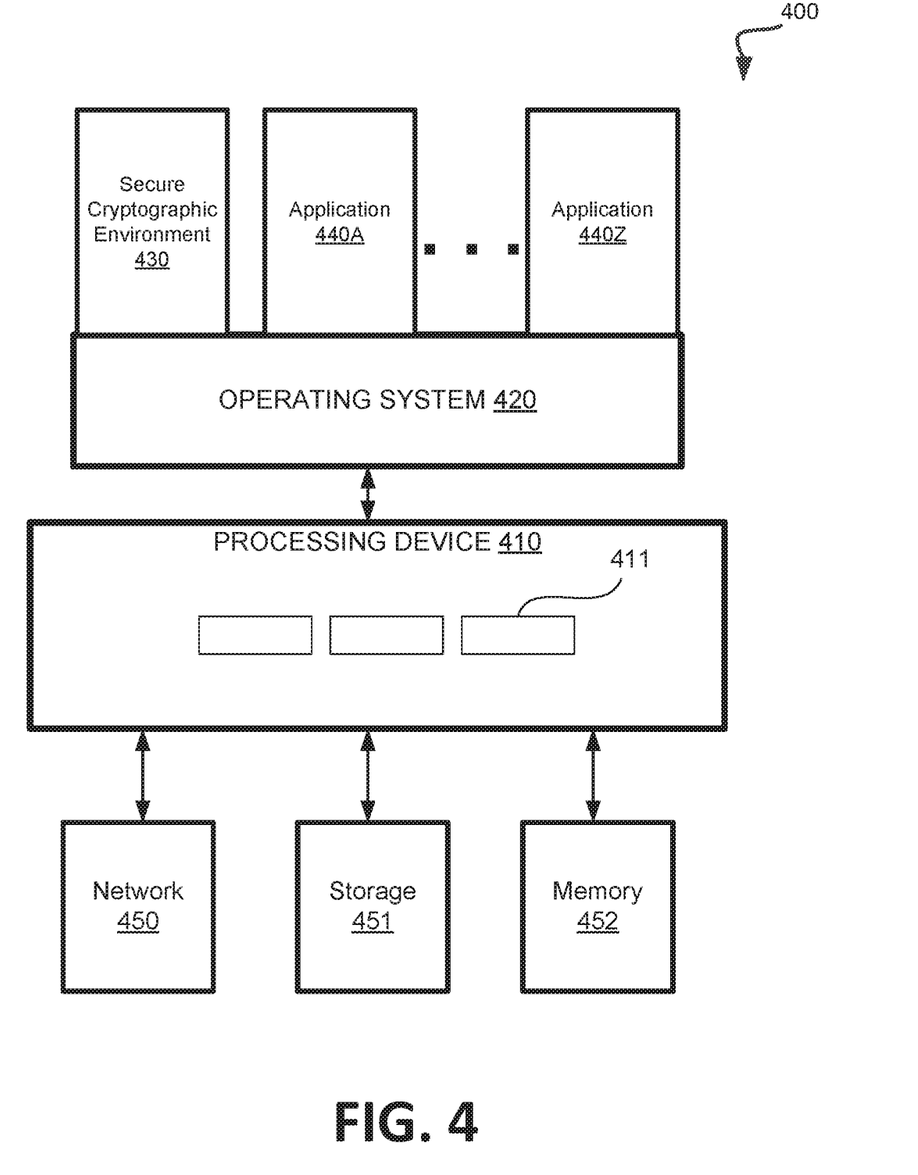
FIG. 4 illustrates an example server that provides secure data integrity for an application in accordance with some embodiments of the present disclosure.

FIG. 4 illustrates an example network server 400 with a secure cryptographic environment 430 to execute an application. In general, a secure cryptographic environment 430 may be hosted by a network server along with one or more other applications 440A to 440Z that are also hosted by the network server or another network server. The secure cryptographic environment 430 may be a secure enclave of a server that is managed by the security manager 120 of FIG. 1.

As shown in FIG. 4, the network server 400 may include a processing device 410 that may execute an operating system 420. Furthermore, the processing device 410 may include one or more internal cryptographic keys 411 that may be used to encrypt and decrypt data stored in a portion of a memory that is assigned to a secure enclave of the secure cryptographic environment 430. As previously described, the access to the data of the secure cryptographic environment 430 in the secure enclave may be protected from the one or more applications 440A to 440Z and the operating system 420. For example, the access to the data of the secure enclave corresponding to the secure cryptographic environment 430 may be protected by the use of one of the internal cryptographic keys 411 that are internal to the processing device 410 so that the access to the data is based on a hardware access as opposed to a software access. The operating system 420 may be associated with a first privilege level and the secure cryptographic environment 430 and the applications 440A to 440Z may be associated with a second privilege level where the first privilege level of the operating system is more privileged than the second privilege level of the various applications that are run on the operating system 420 (e.g., the more privileged level allows access to more resources of the network server than the less privileged level). Thus, the operating system 420 may be allowed access to resources of the applications 440A to 440Z. However, since the secure cryptographic environment 430 is assigned to a secure enclave where access to the data of the secure enclave is based on the use of an internal cryptographic key 411 of the processing device 411, the operating system 420 may not be able to access the data of the secure cryptographic environment 430 despite having a more privileged level of access than the secure cryptographic environment 430.

In operation, the secure cryptographic environment 430 may be hosted on the network server 400. An attestation procedure may be performed to authenticate the secure cryptographic environment 430. After the secure cryptographic environment 430 has been authenticated, a connection may be considered to be established between the security manager and the secure cryptographic environment

430. Since the secure cryptographic environment 430 is assigned to a secure enclave, the data of the secure cryptographic environment 430 may be encrypted and protected by the use of an internal cryptographic key 411 (i.e., an internal key) of the processing device 410. In some embodiments, the secure cryptographic environment 430 may transmit identification information of the secure cryptographic environment 430 to the processing device 410 for the processing device 410 to execute an application within the secure cryptographic environment. The processing device 430 may use an instruction to use one of its internal cryptographic keys 411 that is based on the identification of the secure cryptographic environment 430 to store the data of the application in the memory of the secure enclave of the secure cryptographic environment 430. For example, the data may be securely (e.g., encrypted) stored in the storage 451 or memory 452 associated with the processing device 410 or at another storage resource over a network 450.

In some embodiments, the internal cryptographic key 411 may be combined with additional information (e.g., the identification information of the secure cryptographic environment 430) to generate a secure enclave key for the secure cryptographic environment 430 that is used to decrypt and/or encrypt data associated with the secure cryptographic environment 430. Thus, since the processing device 410 uses its internal cryptographic key 411 to decrypt data and to perform the operations of an application, the data of an application executed at the secure cryptographic environment may not be exposed external to the processing device 410.

Figure 5:
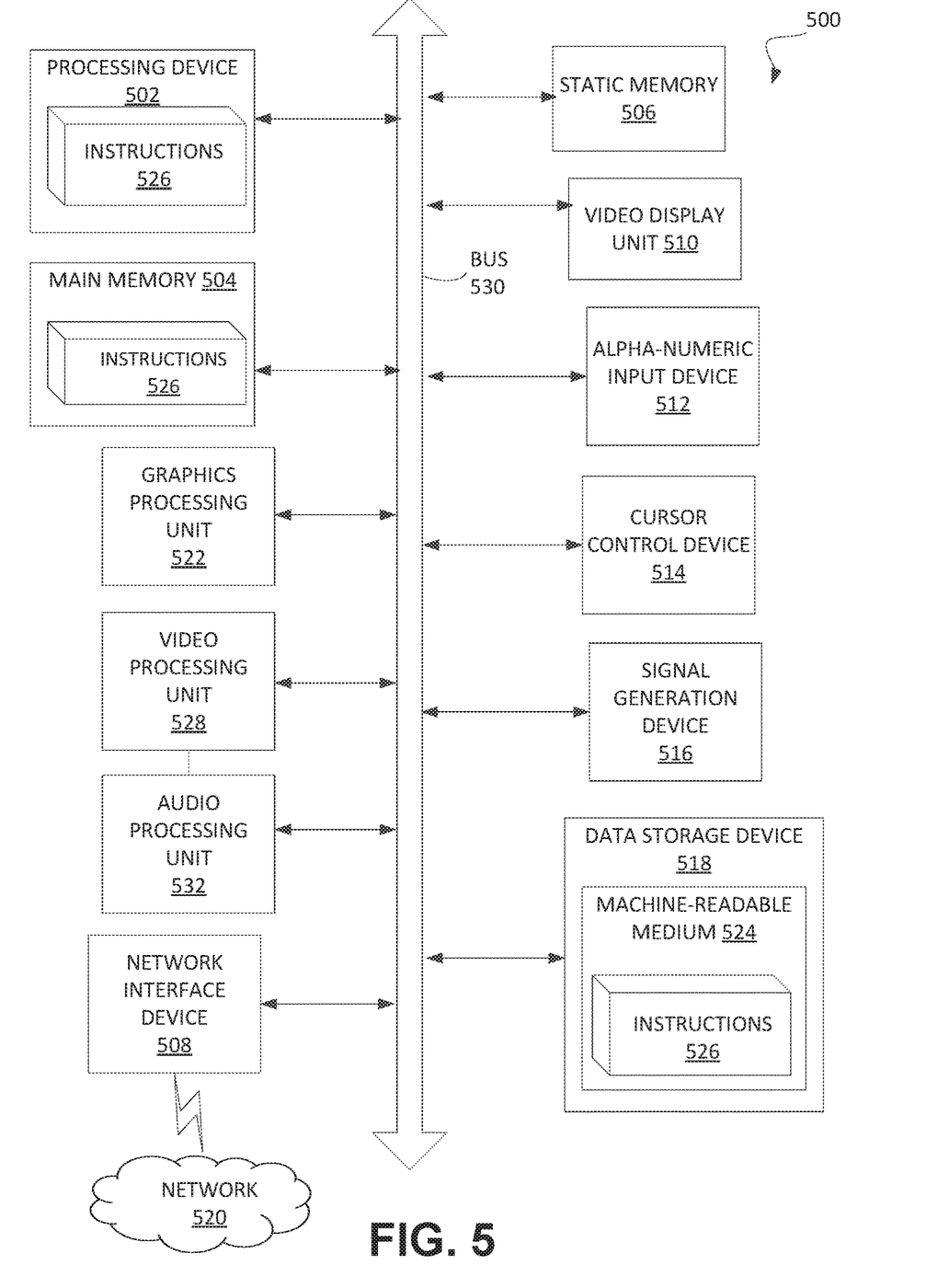
FIG. 5 illustrates an example computer system in which embodiments of the present disclosure operate.

FIG. 5 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In one implementation, the instructions 526 include instructions to implement functionality corresponding to a security manager. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
   receiving a request to provide an application at a secure enclave of a server;
   generating a hash value of the application;
   identifying an application data that is to be used with the application at the secure enclave of the server, wherein the application data corresponds to a file system;
   receiving, from a user, an indication of a portion of the application data that is to be protected with the application, wherein the indication specifies one or more files included in a directory of the file system;
   identifying one or more file hash values, wherein each file hash value is based on a corresponding file included in the directory of the file system;
   generating another hash value based on the portion of the application data that is to be protected with the application and further based on the one or more file hash values; and
   signing, by a processor, the hash value of the application and the another hash value that is based on the portion of the application data that is to be protected with the application, the signed hash value and another hash value being used to execute the application with the application data at the secure enclave of the server.

2. The method of claim 1, wherein the signing of the hash value of the application and the another hash value of the application data is based on a cryptographic key.

3. The method of claim 1, wherein the application data corresponds to configuration settings associated with the application.

4. The method of claim 1, wherein generating the hash value of the application comprises:
   identifying software code of the application; and
   generating the hash value of the application based on the software code of the application.

5. The method of claim 1, wherein the portion of the application data that is to be protected comprises content.

6. The method of claim 1, wherein the
   another hash value is further based on a name and metadata of each file included in the directory of the file system.

7. A system comprising:
   a physical memory; and
   a processor, operatively coupled with the memory, to:
      receive a request to provide an application at a secure enclave of a server;
      generate a hash value of the application;
      identify an application data that is to be used with the application at the secure enclave of the server, wherein the application data corresponds to a file system;
      receive, from a user, an indication of a portion of the application data that is to be protected with the application, wherein the indication specifies one or more files included in a directory of the file system;
      identify one or more file hash values, wherein each file hash value is based on a corresponding file included in the directory of the file system;
      generate another hash value based on the portion of the application data that is to be protected with the application and further based on the one or more file hash values; and
      sign the hash value of the application and the another hash value that is based on the portion of the application data that is to be protected with the application, the signed hash value and another hash value being used to execute the application with the application data at the secure enclave of the server.

8. The system of claim 7, wherein the signing of the hash value of the application and the another hash value of the application data is based on a cryptographic key.

9. The system of claim 7, wherein the application data corresponds to configuration settings associated with the application.

10. The system of claim 7, wherein to generate the hash value of the application, the processor is further to:
   identify software code of the application; and generate the hash value of the application based on the software code of the application.

11. The system of claim 7, wherein the portion of the application data that is to be protected comprises content.

12. The system of claim 7, wherein the cryptographic key is an internal cryptographic key of a processor that is providing the secure enclave.

13. A non-transitory computer readable medium comprising data that, when accessed by a processor, cause the processor to perform operations comprising:

receiving a request to provide an application at a secure enclave of a server;

generating a hash value of the application;

identifying an application data that is to be used with the application at the secure enclave of the server, wherein the application data corresponds to a file system;

receiving, from a user, an indication of a portion of the application data that is to be protected with the application, wherein the indication specifies one or more files included in a directory of the file system;

identifying one or more file hash values, wherein each file hash value is based on a corresponding file included in the directory of the file system;

generating another hash value based on the portion of the application data that is to be protected with the application and further based on the one or more file hash values; and signing the hash value of the application and the another hash value that is based on the portion of the application data that is to be protected with the application, the signed hash value and another hash value being used to execute the application with the application data at the secure enclave of the server.

14. The non-transitory computer readable medium of claim 13, wherein the signing of the hash value of the application and the another hash value of the application data is based on a cryptographic key.

15. The non-transitory computer readable medium of claim 13, wherein the application data corresponds to configuration settings associated with the application.

16. The non-transitory computer readable medium of claim 15, wherein the portion of the application data that is to be protected comprises content.

17. The non-transitory computer readable medium of claim 13, wherein the
another hash value is further based on a name and metadata of each file included in the directory of the file system.

* * * * *